US010329008B2

(12) United States Patent
Walker et al.

(10) Patent No.: US 10,329,008 B2
(45) Date of Patent: Jun. 25, 2019

(54) FLUID-TIGHT MECHANICAL FASTENING SYSTEM AND ASSOCIATED STRUCTURAL ASSEMBLY

(71) Applicant: The Boeing Company, Chicago, IL (US)

(72) Inventors: Steven P. Walker, Arlington, WA (US); Christopher E. Plass, Monroe, WA (US); Michael K. Klein, Bothell, WA (US); John V. Salmi, Arlington, WA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 15/191,819

(22) Filed: Jun. 24, 2016

(65) Prior Publication Data

US 2017/0369149 A1    Dec. 28, 2017

(51) Int. Cl.
*B64C 3/26*    (2006.01)
*F16B 5/06*    (2006.01)
(Continued)

(52) U.S. Cl.
CPC .................. *B64C 3/26* (2013.01); *B64C 3/34* (2013.01); *B64C 5/10* (2017.01); *F16B 5/02* (2013.01);
(Continued)

(58) Field of Classification Search
CPC .......... F16B 5/0258; F16B 5/02; F16B 5/065; B64C 3/26
See application file for complete search history.

(56) References Cited

U.S. PATENT DOCUMENTS 2,700,172 A    1/1955  Rohe
3,037,542 A    6/1962  Boyd
(Continued)

FOREIGN PATENT DOCUMENTS

DE    102010039266    3/2012
EP    0042170    12/1981
(Continued)

OTHER PUBLICATIONS

European Patent Office, Extended European Search Report, EP 17 17 6472 (dated Nov. 27, 2017).
(Continued)

*Primary Examiner* — Brian M O'Hara
(74) *Attorney, Agent, or Firm* — Walters & Wasylyna LLC

(57) ABSTRACT

A structural assembly including a first member having an external side and an internal side, the first member defining a first member through-bore, a second member having an external side and an internal side, the second member defining a second member through-bore aligned with the first member through-bore, and a mechanical fastening system including a bushing at least partially received in the first member through-bore, the bushing defining a bushing through-bore and including a flange, wherein the flange is positioned in a gap between the internal side of the first member and the external side of the second member, a nut plate connected to the internal side of the second member, the nut plate defining a clearance bore aligned with the second member through-bore and the bushing through-bore, the nut plate including a nut, and a bolt extending through the bushing through-bore and into threaded engagement with the nut.

20 Claims, 7 Drawing Sheets

(51) Int. Cl.
  *B64C 3/34* (2006.01)
  *F16B 5/02* (2006.01)
  *B64F 5/10* (2017.01)
  *F16B 19/02* (2006.01)
  *F16B 33/00* (2006.01)
  *F16B 37/14* (2006.01)

(52) U.S. Cl.
  CPC .............. *F16B 5/065* (2013.01); *F16B 19/02* (2013.01); *F16B 33/004* (2013.01); *F16B 37/14* (2013.01)

(56) References Cited

U.S. PATENT DOCUMENTS

| | | | |
|---|---|---|---|
| 4,232,496 A | | 11/1980 | Warkentin |
| 4,456,206 A | * | 6/1984 | Tijssen .................... B64D 11/00 244/118.5 |
| 4,458,108 A | | 7/1984 | Kashimoto et al. |
| 4,854,795 A | * | 8/1989 | Duran .................... F16B 5/0208 24/627 |
| 5,073,070 A | * | 12/1991 | Chang .................... F16B 5/0208 411/105 |
| 7,841,818 B2 | * | 11/2010 | Attanasio .............. F16B 5/0208 411/353 |
| 10,179,640 B2 | * | 1/2019 | Wilkerson ................ B64F 5/10 |

FOREIGN PATENT DOCUMENTS

| | | |
|---|---|---|
| EP | 0547823 | 6/1993 |
| EP | 2690014 | 1/2014 |

OTHER PUBLICATIONS

European Patent Office, "Communication pursuant to Article 94(3) EPC," App. No. 17 176 472.3 (dated Nov. 28, 2018).

\* cited by examiner

FLUID-TIGHT MECHANICAL FASTENING SYSTEM AND ASSOCIATED STRUCTURAL ASSEMBLY

FIELD

This application relates to mechanical fasteners and, more particularly, to structural assemblies, such as aircraft wings, assembled using mechanical fasteners and, even more particularly, to fluid-tight mechanical fastening systems for aircraft wing assembly.

BACKGROUND

The wings of an aircraft are typically constructed from ribs, spars and skin panels (e.g., an upper skin panel and a lower skin panel). Specifically, the ribs are spaced apart from each other along the length of the wing. The forward ends of the ribs are connected to the forward spar, while the aft ends of the ribs are connected to the aft spar. The upper skin panel is connected to the upper portion of each rib, while the lower skin panel is connected to the lower portion of each rib. Therefore, the ribs, the spars and the skin panels define an enclosed wing box, which is commonly used as a fuel tank on passenger and commercial aircraft.

When jet fuel is stored within the wing box, the connections between the skin panels and the ribs must be fluid-tight. Traditionally, the process of fastening skin panels to the ribs to achieve a fluid-tight connection requires personnel to enter and work within the confined space of the wing box. Therefore, various safety precautions must be taken, which increases the overall cost of aircraft manufacture. It would be advantageous to assemble the wing box without the need for entering the wing box.

The wings of certain fighter aircraft are assembled by externally connecting skin panels to the ribs, thereby avoiding the confined space issues associated with personnel enter the wing box. However, to meet battle damage requirements, the fuel on fighter aircraft is typically contained within compartmentalized bladders, rather than by the wing box itself. Therefore, fluid-tightness is less of a concern when externally fastening the skin panels to the ribs on fighter aircraft.

Accordingly, those skilled in the art continue with research and development efforts in the field of aircraft wing assembly.

SUMMARY

In one embodiment, the disclosed mechanical fastening system may include a bushing sized and shaped to be at least partially received in a through-bore of a first member, the bushing defining a bushing through-bore and including a flange positionable between the first member and an opposed second member, a nut plate connectable to the second member, the nut plate including a nut and defining a clearance bore, which may be aligned with a through-bore of the second member, and a bolt configured to pass through the bushing through-bore and into threaded engagement with the nut.

In one embodiment, the disclosed structural assembly may include a first member having an external side and an internal side, the first member defining a first member through-bore, a second member having an external side and an internal side, the second member defining a second member through-bore aligned with the first member through-bore, and a mechanical fastening system including a bushing at least partially received in the first member through-bore, the bushing defining a bushing through-bore and including a flange, wherein the flange is positioned in a gap between the internal side of the first member and the external side of the second member, a nut plate connected to the internal side of the second member, the nut plate defining a clearance bore aligned with the second member through-bore and the bushing through-bore, the nut plate including a nut, and a bolt extending through the bushing through-bore and into threaded engagement with the nut.

In another embodiment, the disclosed structural assembly may include a first member including an external side and an internal side, the first member defining a first member through-bore, a second member including an external side and an internal side, the second member defining a second member through-bore aligned with the first member through-bore, and a mechanical fastening system including an outer bushing at least partially received in the first member through-bore proximate the external side of the first member, the outer bushing defining an outer bushing through-bore, an inner bushing at least partially received in the first member through-bore proximate the internal side of the first member, the inner bushing defining an inner bushing through-bore and including a flange positioned in a gap between the internal side of the first member and the external side of the second member, wherein the flange is in sealing engagement with the external side of the second member, a fillet seal sealing an interface between the flange and the internal side of the first member, a nut plate in sealing engagement with the internal side of the second member, the nut plate defining a clearance bore and including a nut received in the clearance bore, and a bolt extending through the outer bushing through-bore and the inner bushing through-bore, and into threaded engagement with the nut.

In one embodiment, assembling method may include the steps of (1) forming a first member through-bore in a first member and a second member through-bore in a second member; (2) inserting a bushing into the first member through-bore, the bushing defining a bushing through-bore and including a flange, wherein the flange abuts an internal side of the first member; (3) connecting a nut plate to an internal side of the second member, wherein the nut plate defines a clearance bore aligned with the second member through-bore and includes a nut received in the clearance bore; (4) aligning the bushing through-bore with the second member through-bore; and (5) inserting a bolt through the bushing through-bore and threading the bolt into engagement with the nut.

Other embodiments of the disclosed fluid-tight mechanical fastening system and associated structural assembly will become apparent from the following detailed description, the accompanying drawings and the appended claims.

DETAILED DESCRIPTION

Figure 1:
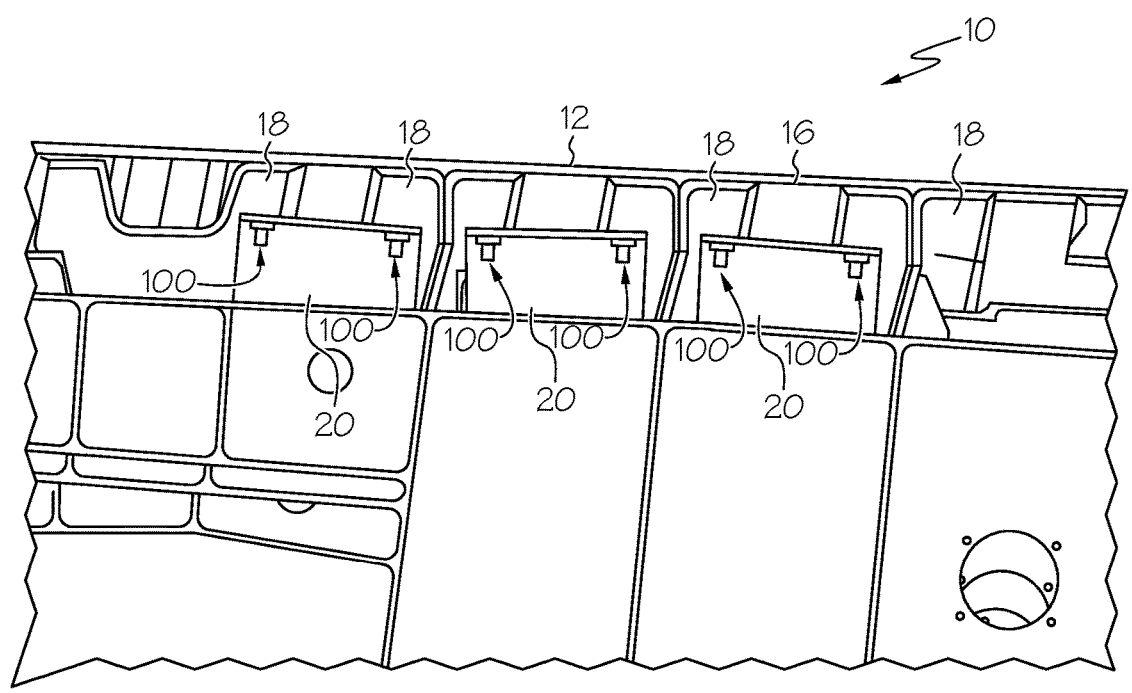
FIG. 1 is a perspective view of an aircraft wing employing the disclosed fluid-tight mechanical fastening system to connect the skin panel to the ribs.
Figure 2:
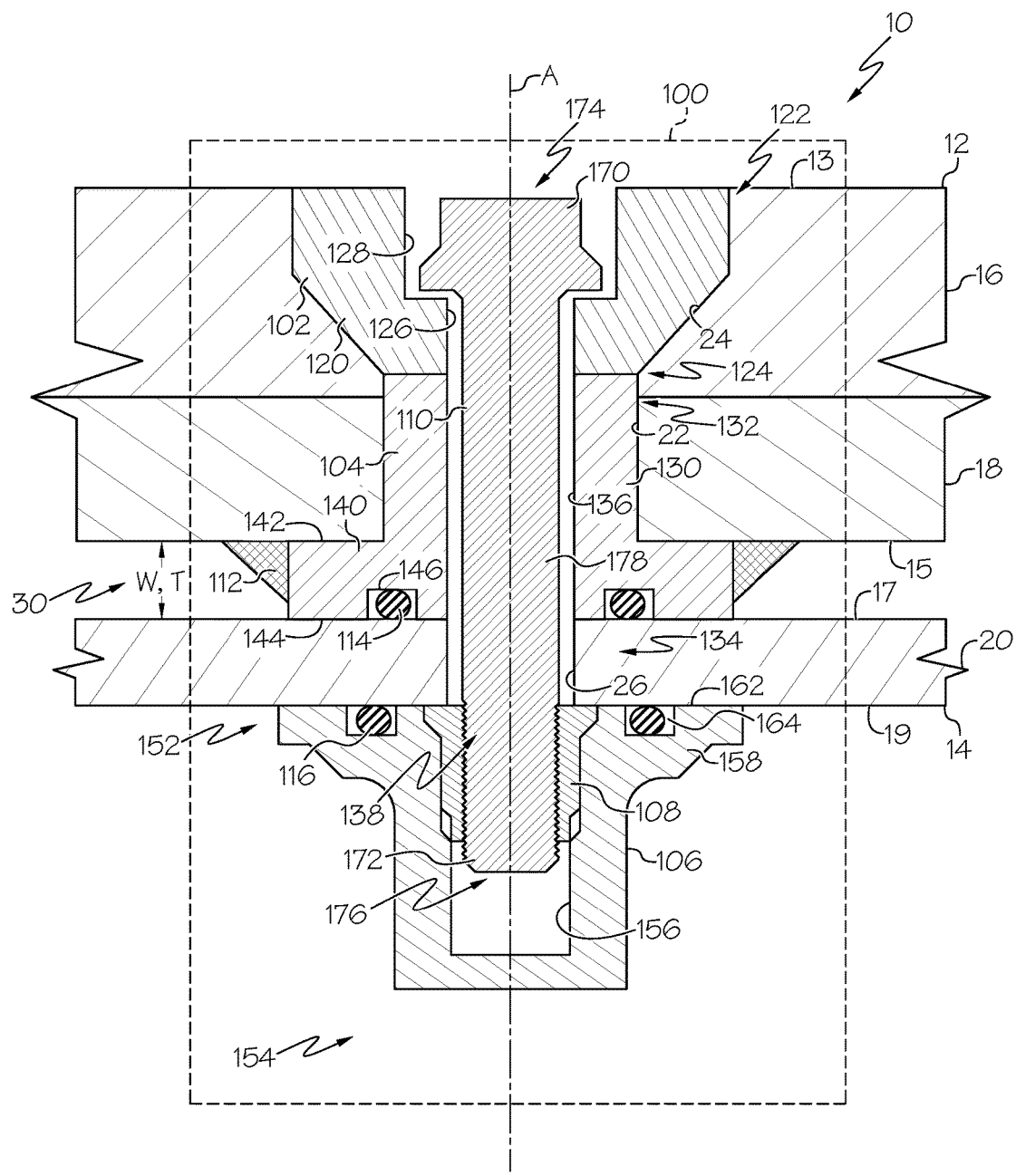
FIG. 2 is a side cross-sectional view of one embodiment of the disclosed mechanical fastening system, shown connecting together the members of a structural assembly.

Referring to FIGS. 1 and 2, disclosed is a fluid-tight mechanical fastening system, generally designated 100, and a structural assembly, generally designated 10, that includes a first member 12 connected to a second member 14 using the disclosed fluid-tight mechanical fastening system 100. As is described in greater detail herein, the disclosed fluid-tight mechanical fastening system 100 may facilitate externally connecting the first member 12 to the second member 14 (from the external side 13 (FIG. 2) of the first member 12), while maintaining the fluid-tightness of the first member 12.

In one particular application, the disclosed structural assembly 10 may be the wing of an aircraft, such as a passenger or commercial aircraft. Therefore, the first member 12 of the structural assembly 10 may include an aircraft wing skin panel 16 and, optionally, stringers 18 connected to the skin panel 16, while the second member 14 of the structural assembly 10 may include inspar ribs 20. However, those skilled in the art will appreciate that various members may be connected together using the disclosed fluid-tight mechanical fastening system 100, whether for aerospace applications or non-aerospace applications, without departing from the scope of the present disclosure.

Referring now to FIG. 2, the first member 12 of the structural assembly 10 may define a first member through-bore 22, and the first member through-bore 22 may include a countersink 24. The second member 14 of the structural assembly 10 may define a second member through-bore 26. The first member through-bore 22 may be aligned with the second member through-bore 26 along a through-bore axis A. The disclosed fluid-tight mechanical fastening system 100 may extend through the first member through-bore 22 and the second member through-bore 26 to connect the first member 12 to the second member 14.

The disclosed fluid-tight mechanical fastening system 100 may include an outer bushing 102, an inner bushing 104, a nut plate 106, a nut 108 and a bolt 110. Additional components and features may be included in the disclosed fluid-tight mechanical fastening system 100 without departing from the scope of the present disclosure. For example, in a particular embodiment, the disclosed fluid-tight mechanical fastening system 100 may further include a first seal 112 (e.g., a fillet seal) between the first member 12 and the inner bushing 104, a second seal 114 (e.g., an O-ring) between the inner bushing 104 and the second member 14 and/or a third seal 116 (e.g., an O-ring) between the second member 14 and the nut plate 106.

The outer bushing 102 of the disclosed fluid-tight mechanical fastening system 100 may include a body 120 sized and shaped to be closely received within the first member through-bore 22 of the first member 12 of the structural assembly 10 proximate (at or near) the external side 13 of the first member 12. For example, the body 120 of the outer bushing 102 may be sized and shaped to be closely received within the countersink 24 of the first member through-bore 22 of the first member 12. The body 120 of the outer bushing 102 may include a first end portion 122 and a second end portion 124 axially opposed (vis-a-vis the through-bore axis A) from the first end portion 122. The body 120 of the outer bushing 102 may define an outer bushing through-bore 126 that axially extends from the first end portion 122 to the second end portion 124. The outer bushing through-bore 126 may include a counterbore 128 proximate the first end portion 122 of the body 120 of the outer bushing 102.

The body 120 of the outer bushing 102 may be formed from various materials, including combinations of materials, without departing from the scope of the present disclosure. Forming the body 120 of the outer bushing 102 from an electrically conductive material may promote charge dissipation to the surrounding first member 12 in the event of a lightning strike. The strength and rigidity of the material forming the body 120 of the outer bushing 102 may also be a consideration since the bolt 110 may directly contact the outer bushing 102. In one particular construction, the body 120 of the outer bushing 102 may be formed from a metallic material (e.g., a metal or metal alloy). As one specific, non-limiting example, the body 120 of the outer bushing 102 may be formed from a titanium alloy, such as an aerospace-grade titanium alloy (e.g., Ti-6Al-4V or Ti-5Al-2.5Sn). However, the use of non-metallic materials, such as polymeric and composite materials (e.g., carbon fiber reinforced plastics), is also contemplated.

The inner bushing 104 of the disclosed fluid-tight mechanical fastening system 100 may include a body 130 sized and shaped to be closely received within the first member through-bore 22 of the first member 12 of the structural assembly 10 proximate the internal side 15 of the first member 12. The body 130 of the inner bushing 104 may include a first end portion 132 and a second end portion 134 axially opposed (vis-a-vis the through-bore axis A) from the first end portion 132. The body 130 of the inner bushing 104 may define an inner bushing through-bore 136 that axially extends from the first end portion 132 to the second end portion 134.

Thus, in the assembled configuration shown in FIG. 2, the first end portion 132 of the inner bushing 104 may abut the second end portion 124 of the outer bushing 102. Furthermore, in the assembled configuration, the outer bushing through-bore 126 may be axially aligned with the inner bushing through-bore 136, which may be axially aligned with the second member through-bore 26 of the second member 14, thereby defining a bolt receiving bore 138 comprising the outer bushing through-bore 126, the inner bushing through-bore 136, the second member through-bore 26 and the clearance bore 156 of the nut plate 106.

A flange 140 may protrude outward from the body 130 of the inner bushing 104 proximate the second end portion 134 of the body 130. The flange 140 may be positioned in the gap 30 between the first member 12 and the second member 14, and may include a first surface 142 abutting the internal side 15 of the first member 12 and a second surface 144 abutting the external side 17 of the second member 14. The second surface 144 of the flange 140 may be axially opposed (vis-a-vis the through-bore axis A) from the first surface 142, thereby defining a flange thickness T therebetween. The flange thickness T may be substantially equal to the width W of the gap 30 between the first member 12 and the second member 14, thereby potentially eliminating the need for placing shims between the first member 12 and the second member 14.

The first seal 112 may seal the interface between the internal side 15 of the first member 12 and the flange 140 of the inner bushing 104, thereby inhibiting (if not absolutely preventing) the passage of fluid through the interface. For example, the first seal 112 may be a fillet seal that circumferentially extends about the flange 140 of the inner bushing 104. For example, the first seal 112 may be formed from (or may include) a polysulfide-based joint sealant material. Other techniques may also be used for sealing the interface between the internal side 15 of the first member 12 and the flange 140 of the inner bushing 104.

The second surface 144 of the flange 140 of the inner bushing 104 may define a circumferential groove 146. The second seal 114, which may be an O-ring or the like, may be received in the groove 146. The second seal 114 may seal the interface between the inner bushing 104 and the second member 14 when the second surface 144 of the flange 140 of the inner bushing 104 abuts the external side 17 of the second member 14. Therefore, the flange 140 of the inner bushing 104 may be in sealing engagement with the external side 17 of the second member 14.

The body 130 of the inner bushing 104 may be formed from various materials, including combinations of materials, without departing from the scope of the present disclosure. In one particular construction, the body 130 of the inner bushing 104 may be formed from a polymeric material. As one specific, non-limiting example, the body 130 of the inner bushing 104 may be formed from a dielectric thermoplastic polymer, such as polyether ether ketone (PEEK). However, the use of other materials, such as composite materials and metallic materials, is also contemplated.

The nut plate 106 of the disclosed fluid-tight mechanical fastening system 100 may include a body 150 having a first end portion 152 and a second end portion 154 axially opposed (vis-a-vis the through-bore axis A) from the first end portion 152. The body 150 of the nut plate 106 may define a clearance bore 156 that extends from the first end portion 152 toward (but not completely through) the second end portion 154. A flange 158 may protrude outward from the body 150 of the nut plate 106 proximate the first end portion 152 of the body 150.

The nut 108 may be received in (e.g., press-fit into) the clearance bore 156 of the nut plate 106 proximate the first end portion 152 of the body 150 of the nut plate 106. The nut 108 may be engaged with the nut plate 106 such that the nut 108 does not rotate relative to the nut plate 106 about the through-bore axis A. For example, the nut 108 may have a hex-shaped cross-sectional profile, and the clearance bore 156 of the nut plate 106 may have a corresponding hex shape.

As shown in FIG. 2, the nut plate 106 and the nut 108 may be two separate components. However, in one variation, the nut 108 may be integral with the nut plate 106 (i.e., the nut 108 and the nut plate 106 may be formed as a single monolithic body).

The nut plate 106 and the nut 108 may be compositionally the same or different. In one particular construction, the nut plate 106 may be formed from a polymeric material, while the nut 108 may be formed from a metallic material (e.g., a metal or metal alloy). As one specific, non-limiting example, the nut plate 106 may be formed from a dielectric thermoplastic polymer, such as polyether ether ketone (PEEK), while the nut 108 may be formed from a titanium alloy, such as an aerospace-grade titanium alloy (e.g., Ti-6Al-4V or Ti-5Al-2.5Sn).

Figure 3:
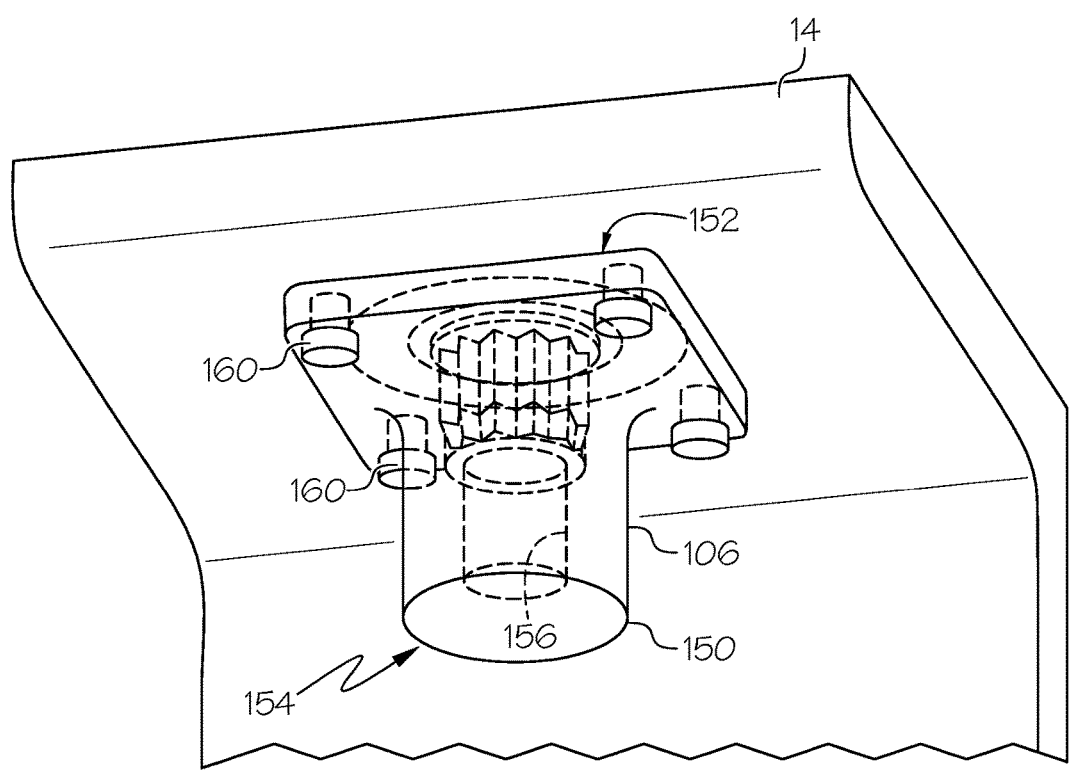
FIG. 3 is a perspective view of a portion of the mechanical fastening system of FIG. 2.

The nut plate 106 may be connected to the second member 14 such that the nut 108 and the clearance bore 156 are axially aligned with the outer bushing through-bore 126, the inner bushing through-bore 136 and the second member through-bore 26. Various techniques may be used to connect the nut plate 106 to the second member 14. For example, as shown in FIG. 3, mechanical fasteners 160 (e.g., rivets, screws, bolts or the like) may be inserted through the flange 158 of the nut plate 106 and into engagement with the adjacent second member 14 to connect the nut plate 106 to the second member 14.

Referring back to FIG. 2, the mating surface 162 of the flange 158 of the nut plate 106 may define a circumferential groove 164. The third seal 116, which may be an O-ring or the like, may be received in the groove 164. The third seal 116 may seal the interface between the second member 14 and the nut plate 106 when the mating surface 162 of the flange 158 of the nut plate 106 abuts the internal side 19 of the second member 14. Therefore, the flange 158 of the nut plate 106 may be in sealing engagement with the internal side 19 of the second member 14.

The bolt 110 of the disclosed fluid-tight mechanical fastening system 100 may include a head 170 and a threaded portion 172 disposed at opposite ends 174, 176 of a shaft 178. The shaft 178 of the bolt 110 may extend through the bolt receiving bore 138 defined by the outer bushing through-bore 126, the inner bushing through-bore 136, the second member through-bore 26 and the clearance bore 156 such that the threaded portion 172 of the bolt 110 may be threaded into engagement with the nut 108. When the threaded portion 172 of the bolt 110 is threaded into engagement with the nut 108, the head 170 of the bolt 110 may be received in the counterbore 128 of the outer bushing through-bore 126 of the outer bushing 102 and may abut the outer bushing 102.

The bolt 110 may be formed from various materials, including combinations of materials, without departing from the scope of the present disclosure. Consideration may be given to forming the bolt 110 from the same material as the nut 108. In one particular construction, the bolt 110 may be formed from a metallic material (e.g., a metal or metal alloy). As one specific, non-limiting example, the bolt 110 may be formed from a titanium alloy, such as an aerospace-grade titanium alloy (e.g., Ti-6Al-4V or Ti-5Al-2.5Sn). However, the use of other materials, such as composite materials, is also contemplated.

Referring now to FIGS. 4A-4D, illustrated are steps of the disclosed method for assembling a structural assembly 10 (FIG. 2) using the disclosed fluid-tight mechanical fastening system 100 (FIG. 2). Additional steps, such as the manufacture of the components (e.g., the outer bushing 102, the inner bushing 104, the nut plate 106, the nut 108 and the bolt 110) of the disclosed fluid-tight mechanical fastening system 100, are also contemplated.

Figure 4A:
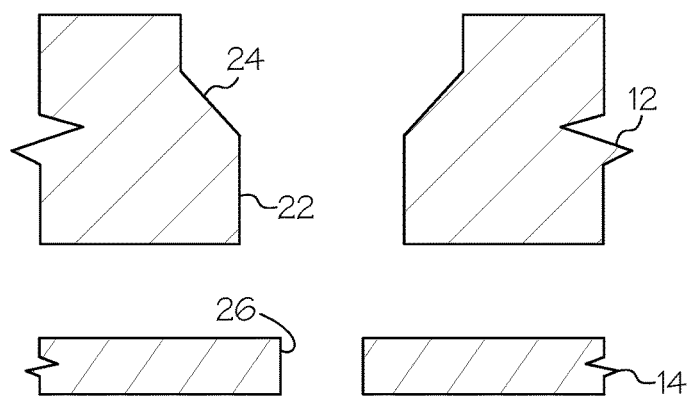
FIGS. 4A-4D are side cross-sectional views depicting steps involved in assembling a structural assembly using the mechanical fastening system of FIG. 2.

As shown in FIG. 4A, a first member 12 and a second member 14 may be provided. A first member through-bore 22, which may include a countersink 24, may be formed in the first member 12. A second member through-bore 26 may be formed in the second member 14. The first member through bore 22 and the second member through-bore 26 may be formed, for example, by machining/drilling the first and second members 12, 14 using an appropriate tool.

Figure 4B:
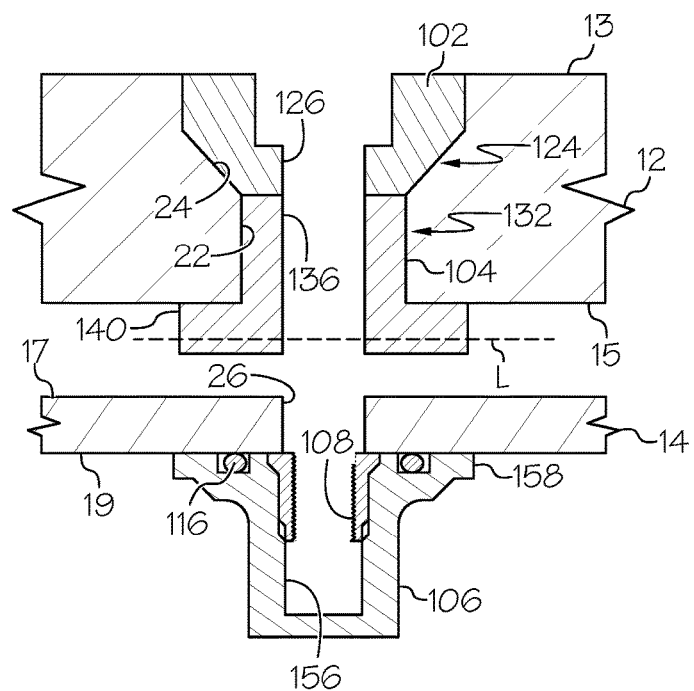

As shown in FIG. 4B, the outer bushing 102 of the disclosed fluid-tight mechanical fastening system 100 (FIG. 2) may be inserted into the first member through-bore 22 such that the outer bushing 102 is seated in the countersink 24 of the first member through-bore 22. Additionally, the inner bushing 104 may be inserted into the first member through-bore 22 such that the flange 140 abuts the internal side 15 of the first member 12. With the outer and inner bushings 102, 104 inserted, the outer bushing through-bore 126 may be aligned with the inner bushing through-bore 136, and the first end portion 132 of the inner bushing 104 may abut the second end portion 124 of the outer bushing 102.

Still referring to FIG. 4B, the nut plate 106 (including the nut 108 and the third seal 116) may be connected to the internal side 19 of the second member 14 such that the nut 108 and the clearance bore 156 are aligned with the second member through-bore 26 defined by the second member 14. As shown in FIG. 3, the connection between the nut plate 106 and the second member 14 may be made, for example, with mechanical fasteners 160 inserted through the flange 158 of the nut plate 106 and into engagement with the second member 14. The connection between the nut plate 106 and the second member 14 may compress the third seal 116 between the nut plate 106 and the internal side 19 of the second member 14.

Still referring to FIG. 4B, the thickness T (FIG. 2) of the flange 140 of the inner bushing 104 may initially be greater than desired. Therefore, prior to moving on to the next step of the disclosed assembling method, the flange 140 may optionally be cut along line L, such as with a saw or like tool, to provide the flange 140 of the inner bushing 104 with the desired thickness T. The desired thickness T and, thus, location of line L may depend on the magnitude of the gap 30 (FIG. 2) between the assembled first member 12 and second member 14.

Figure 4C:
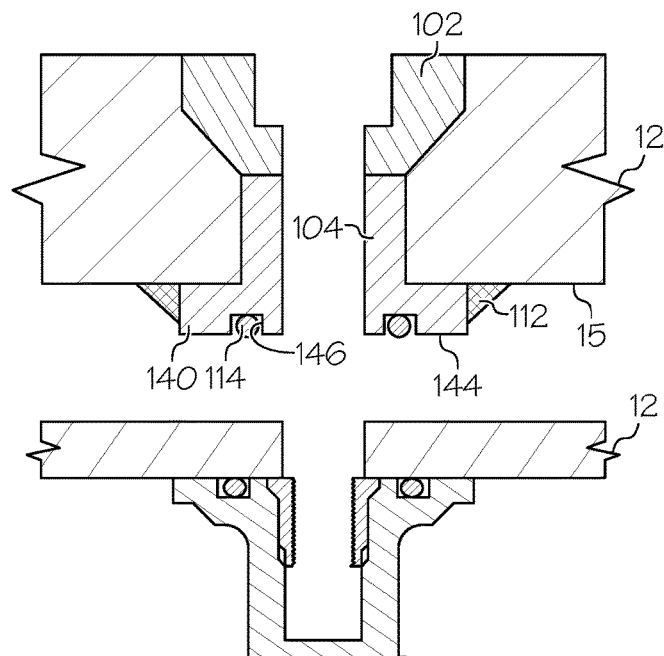

As shown in FIG. 4C, once the flange 140 of the inner bushing 104 has optionally been trimmed to size (e.g., along line L shown in FIG. 4B), the first seal 112 and the second seal 114 may be introduced. The first seal 112 may be introduced by applying a sealant material as a fillet that circumferentially extends about the flange 140 of the inner bushing 104 between the inner bushing 104 and the internal side 15 of the first member 12. The second seal 114, which may be an O-ring or the like, may be introduced by cutting a groove 146 in the second surface 144 of the flange 140 and inserting the second seal 114 (e.g., O-ring) into the cut groove 146.

Figure 4D:
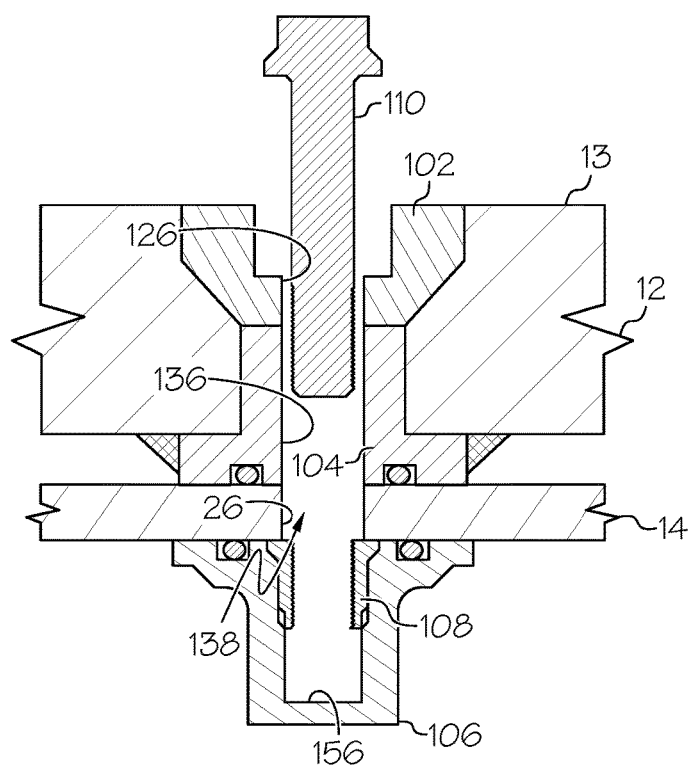

As shown in FIG. 4D, with the outer and inner bushings 102, 104 assembled on the first member 12 and the nut plate 106 and nut 108 assembled on the second member 14, the first member 12 may be approximated with the second member 14 to bring the outer bushing through-bore 126 and the inner bushing through-bore 136 into alignment with the second member through-bore 26 and the clearance bore 156, thereby defining the bolt receiving bore 138. Then, the bolt 110 may be introduced from the external side 13 of the first member 12, passed through the bolt receiving bore 138 and, ultimately (see FIG. 2), threaded into engagement with the nut 108, thereby forming the structural assembly 10 shown in FIG. 2.

Accordingly, when the bolt 110 is fully threaded into engagement with the nut 108, as shown in FIG. 2, the second seal 114 may become compressed between the inner bushing 104 and the external side 17 of the second member 14. Therefore, the bolt receiving bore 138 may be isolated from any fluids (e.g., jet fuel) on the internal side 15 of the first member 12.

Figure 5:
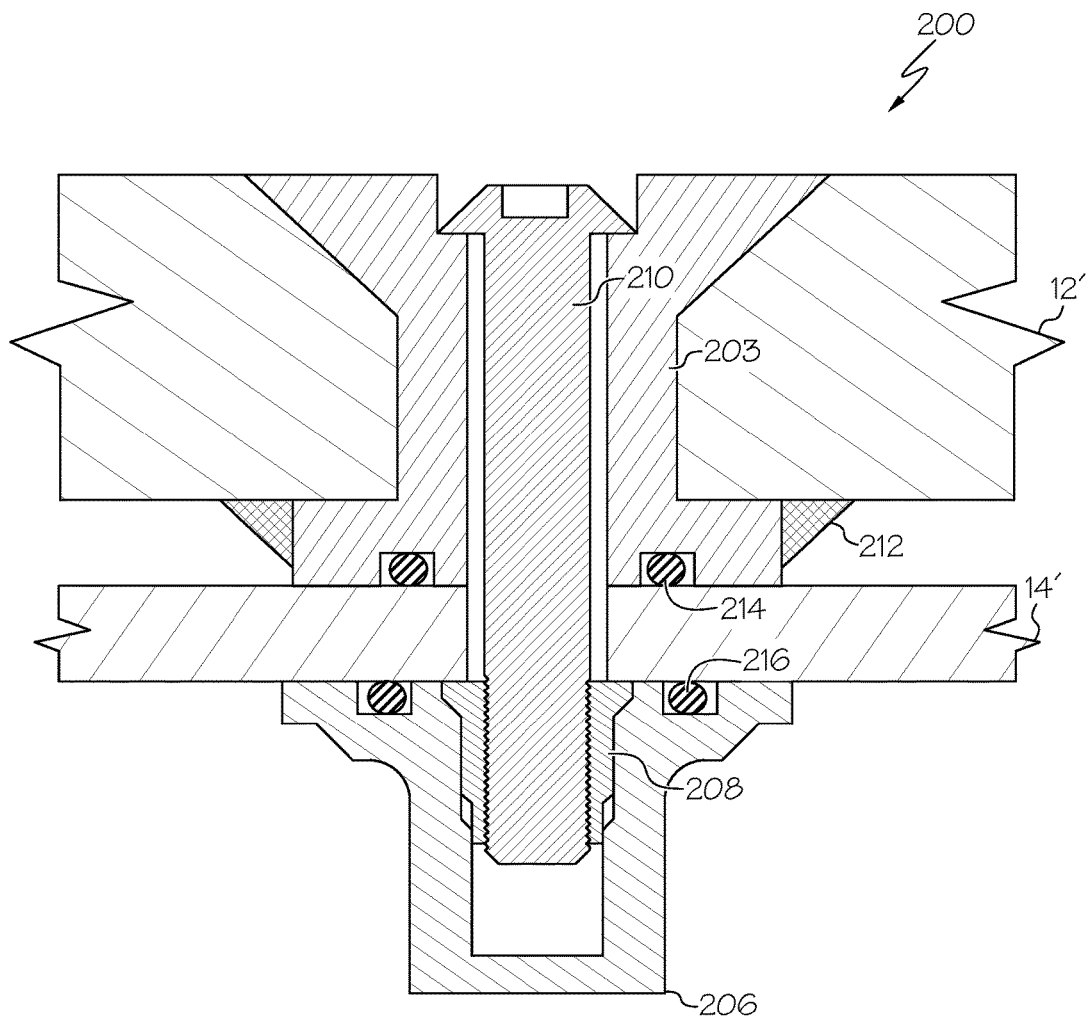
FIG. 5 is a side cross-sectional view of one alternative embodiment of the disclosed mechanical fastening system.

Referring to FIG. 5, one alternative embodiment of the disclosed fluid-tight mechanical fastening system, generally designated 200, may include a bushing 203, a nut plate 206, a nut 208 and a bolt 210. The disclosed fluid-tight mechanical fastening system 200 may further include a first seal 212 (e.g., a fillet seal) between the first member 12' and the bushing 203, a second seal 214 (e.g., an O-ring) between the bushing 203 and the second member 14' and/or a third seal 216 (e.g., an O-ring) between the second member 14' and the nut plate 206.

System 200 may be substantially the same as system 100, with the exception of a single bushing 203 in place of the outer bushing 102 and the inner bushing 104 of system 100.

Figure 6:
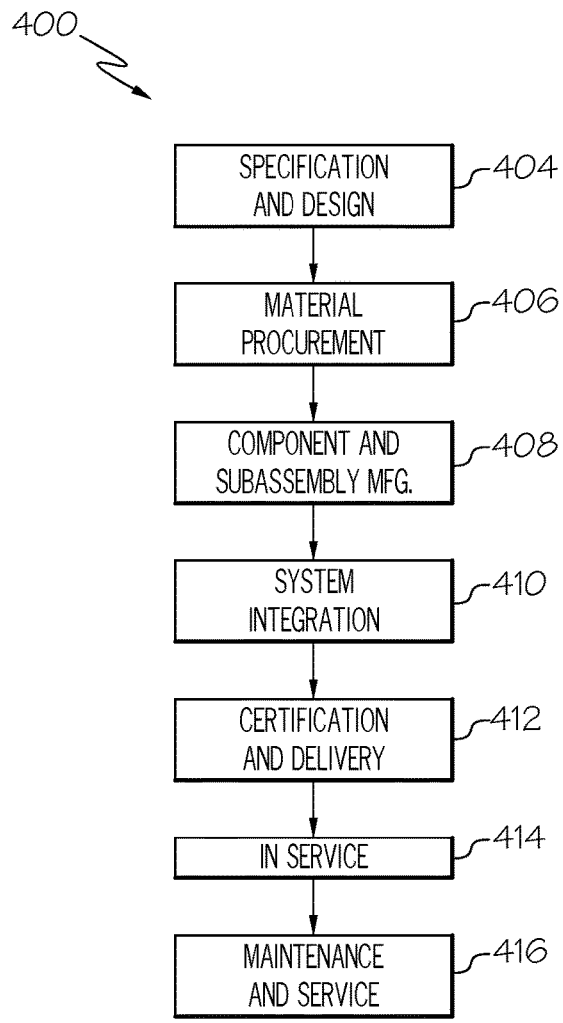
FIG. 6 is flow diagram of an aircraft manufacturing and service methodology.
Figure 7:
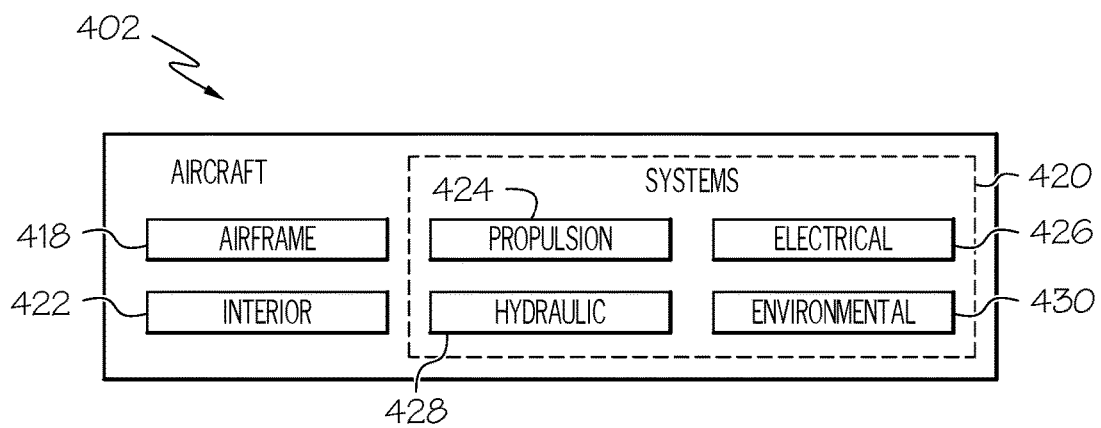
FIG. 7 is a block diagram of an aircraft.

The bushing 203 may be formed from various materials, including combinations of materials, without departing from the scope of the present disclosure. Flexibility (during insertion of the bushing 203 into the first member 12') may be a material selection consideration. In one particular construction, the bushing 203 may be formed from a polymeric material. As one specific, non-limiting example, the bushing 203 may be formed from a dielectric thermoplastic polymer, such as polyether ether ketone (PEEK). However, the use of other materials, such as composite materials and metallic materials, is also contemplated Examples of the disclosure may be described in the context of an aircraft manufacturing and service method 400, as shown in FIG. 6, and an aircraft 402, as shown in FIG. 7. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed fluid-tight mechanical fastening system may be employed during any one or more of the stages of the aircraft manufacturing and service method 400. As one example, the disclosed fluid-tight mechanical fastening system may be employed during material procurement 406. As another example, components or subassemblies corresponding to component/subassembly manufacturing 408, system integration 410, and or maintenance and service 416 may be fabricated or manufactured using the disclosed fluid-tight mechanical fastening system. As another example, the airframe 418 and/or the interior 422 may be constructed using the disclosed fluid-tight mechanical fastening system. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed fluid-tight mechanical fastening system and associated structural assembly are described in the context of an aircraft; however, one of ordinary skill in the art will readily recognize that the disclosed fluid-tight mechanical fastening system and associated structural assembly may be utilized for a variety of vehicles, as well as for non-vehicle applications. For example, implementations of the embodiments described herein may be implemented in any type of vehicle including, e.g., helicopters, passenger ships, automobiles and the like.

Although various embodiments of the disclosed fluid-tight mechanical fastening system and associated structural assembly have been shown and described, modifications may occur to those skilled in the art upon reading the specification. The present application includes such modifications and is limited only by the scope of the claims.

What is claimed is:

1. A structural assembly comprising:
   a first member comprising an external side and an internal side, said first member defining a first member through-bore;
   a second member comprising an external side and an internal side, said second member defining a second member through-bore aligned with said first member through-bore; and
   a mechanical fastening system comprising:
      a bushing at least partially received in said first member through-bore, said bushing defining a bushing through-bore and comprising a flange, wherein said flange is positioned in a gap between said internal side of said first member and said external side of said second member;
      a nut plate connected to said internal side of said second member, said nut plate defining an enclosed clearance bore aligned with said second member through-bore and said bushing through-bore, said nut plate comprising a nut, wherein said enclosed clearance bore extends from a first end portion adjacent to said second member to a second end portion opposite said first end portion, wherein said first end portion is an open end and said second end portion is a closed end; and
      a bolt extending through said bushing through-bore and into threaded engagement with said nut.

2. The structural assembly of claim 1 further comprising a first seal sealing an interface between said flange and said internal side of said first member.

3. The structural assembly of claim 2 wherein said first seal comprises a fillet seal.

4. The structural assembly of claim 1 further comprising a second seal positioned between said flange and said external side of said second member.

5. The structural assembly of claim 4 wherein said second seal comprises an O-ring, and wherein said O-ring is received in a groove formed in said bushing.

6. The structural assembly of claim 1 further comprising a third seal positioned between said nut plate and said internal side of said second member.

7. The structural assembly of claim 6 wherein said third seal comprises an O-ring, and wherein said O-ring is received in a groove formed in said nut plate.

8. The structural assembly of claim 1 further comprising an outer bushing at least partially received in said first member through-bore, said outer bushing defining an outer bushing through-bore aligned with said bushing through-bore of said bushing.

9. The structural assembly of claim 8 wherein said first member through-bore comprises a countersink, and wherein said outer bushing is seated in said countersink.

10. The structural assembly of claim 8 wherein said outer bushing is formed from a metallic material.

11. The structural assembly of claim 10 wherein said bushing and said nut plate are formed from a polymeric material.

12. The structural assembly of claim 1 wherein said nut is press-fit into said clearance bore.

13. The structural assembly of claim 1 wherein said nut plate is connected to said internal side of said second member with mechanical fasteners.

14. An aircraft comprising said structural assembly of claim 1.

15. The aircraft of claim 14 wherein said first member comprises an aircraft wing skin panel and said second member comprises a rib.

16. A structural assembly comprising:
   a first member comprising an external side and an internal side, said first member defining a first member through-bore;
   a second member comprising an external side and an internal side, said second member defining a second member through-bore aligned with said first member through-bore; and
   a mechanical fastening system comprising:
      an outer bushing at least partially received in said first member through-bore proximate said external side of said first member, said outer bushing defining an outer bushing through-bore;
      an inner bushing at least partially received in said first member through-bore proximate said internal side of said first member, said inner bushing defining an inner bushing through-bore and comprising a flange positioned in a gap between said internal side of said first member and said external side of said second member, wherein said flange is in sealing engagement with said external side of said second member;
      a fillet seal sealing an interface between said flange and said internal side of said first member;
      a nut plate in sealing engagement with said internal side of said second member, said nut plate defining an enclosed clearance bore and comprising a nut received in said clearance bore, wherein said enclosed clearance bore extends from a first end portion adjacent to said second member to a second end portion opposite said first end portion, wherein said first end portion is an open end and said second end portion is a closed end; and
      a bolt extending through said outer bushing through-bore and said inner bushing through-bore, and into threaded engagement with said nut.

17. The structural assembly of claim 16 wherein said outer bushing is formed from a metallic material and said inner bushing is formed from a polymeric material.

18. A method for assembling a first member and a second member comprising:
   forming a first member through-bore in said first member and a second member through-bore in said second member;

inserting a bushing into said first member through-bore, said bushing defining a bushing through-bore and comprising a flange, wherein said flange abuts an internal side of said first member;

connecting a nut plate to an internal side of said second member, wherein said nut plate defines an enclosed clearance bore aligned with said second member through-bore and comprises a nut received in said clearance bore, wherein said enclosed clearance bore extends from a first end portion adjacent to said second member to a second end portion opposite said first end portion, wherein said first end portion is an open end and said second end portion is a closed end;

aligning said bushing through-bore with said second member through-bore; and inserting a bolt through said bushing through-bore and threading said bolt into engagement with said nut.

19. The method of claim 18 further comprising:

applying a first seal to an interface between said flange and said internal side of said first member;

applying a second seal to said flange such that said second seal seals an interface between said flange and an external side of said second member; and applying a third seal to said nut plate such that said third seal seals an interface between said nut plate and said internal side of said second member.

20. The method of claim 18 further comprising trimming said flange prior to said step of inserting said bolt.

* * * * *